M. P. POWELL, Jr.
SHAFT DETACHING DEVICE.
APPLICATION FILED JAN. 18, 1909.
938,890.
Patented Nov. 2, 1909.
2 SHEETS—SHEET 1.
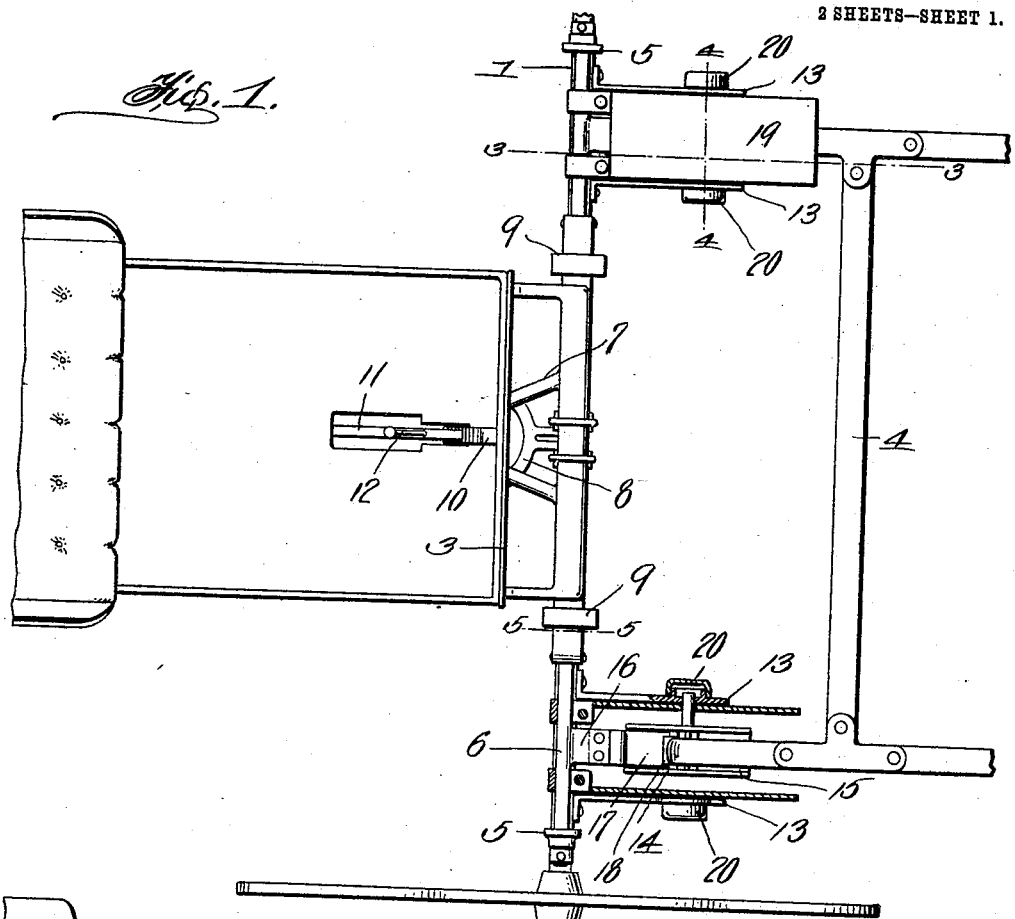
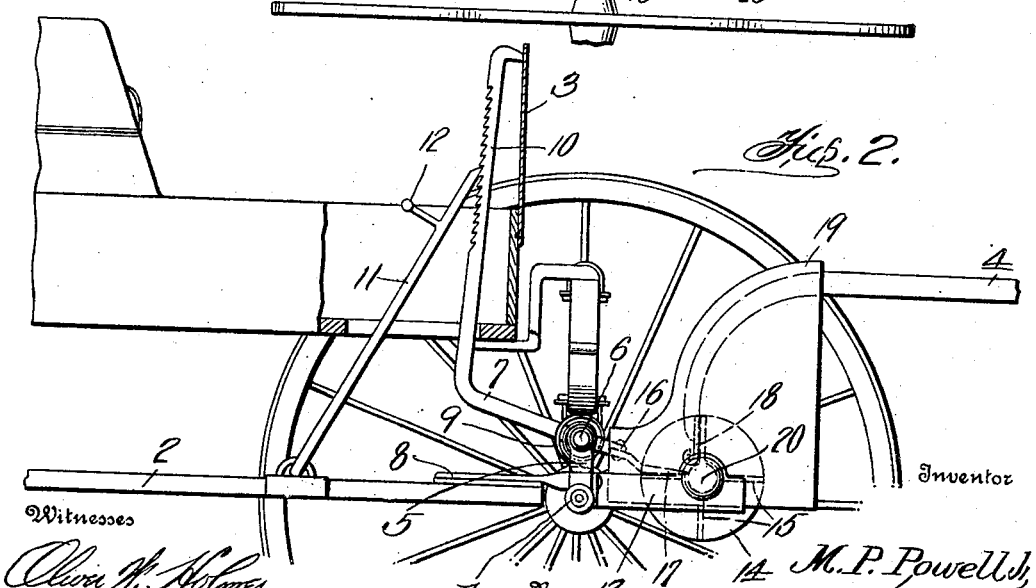

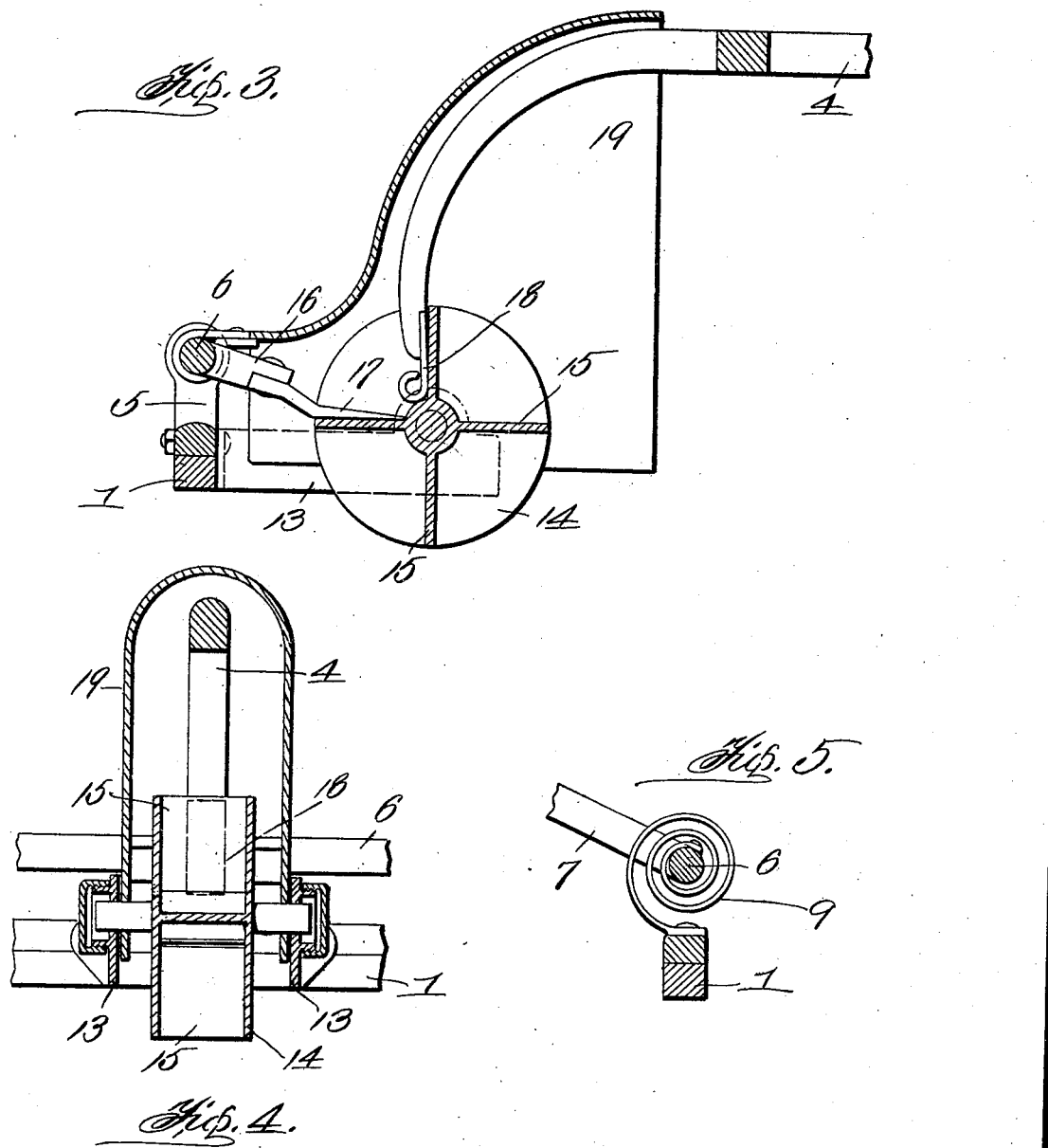

UNITED STATES PATENT OFFICE.

MILTON POLLAK POWELL, JR., OF HIGHLANDALE, MISSISSIPPI.

SHAFT-DETACHING DEVICE.

938,890. Specification of Letters Patent. Patented Nov. 2, 1909.

Application filed January 18, 1909. Serial No. 472,853.

*To all whom it may concern:*

Be it known that I, MILTON POLLAK POWELL, Jr., a citizen of the United States, residing at Highlandale, in the county of Leflore and State of Mississippi, have invented a new and useful Improvement in Shaft-Detaching Devices, of which the following is a specification.

This invention relates to a device for detachably connecting shafts to a vehicle and the object of the invention is to permit immediate detachment of the shafts in the case of an emergency such as a runaway.

The invention consists in providing for each shaft a rotatable webbed drum, means for locking said drums against rotation, means for engaging the shafts with said drums, during such time as the drums are held against rotation, together with means for instantly releasing said locking means thus allowing the pull of the shafts upon the drums to cause their rotation and thereby disengage the shafts from said drums.

In these drawings, Figure 1 is a plan view of my device, applied to a vehicle, a shield being removed. Fig. 2 is a side elevation. Fig. 3 is a section on the line 3—3 of Fig. 1. Fig. 4 is a section on the line 4—4 of Fig. 1. Fig. 5 is a section on the line 5—5 of Fig. 1.

In these drawings, 1 represents the front axle, 2 the coupling pole, 3 the dash board and 4 the shafts, all of which are similar to those in common use, but the shafts are not permanently attached as is the usual case to the axle 1. Extending upwardly from the ends of the axle are suitable plates 5 provided with suitable sockets upon their inner faces in which loosely work the ends of a rod 6, the central portion of said rod being cranked or off-set as shown at 7, said off-set portion occurring above the fifth wheel 8 of the vehicle, and between the axle and the rod 6 and secured to both axle and rod are springs 9 which normally hold the rod in such position that the off-set portion will project upwardly and rearwardly with respect to said fifth wheel. This off-set portion carries an upwardly extending lever 10 which extends through a suitable slot formed in the bottom of the vehicle immediately to the rear of the dash board, and this lever is about the height of the dash board and the upper end portion of the lever is curved slightly forward to engage the upper portion of the dash board upon its rear face. This prevents the lines from accidentally dropping down between said lever and the dash board, and it will be understood that the said curved end does not in any case hook over the top of the dash board.

To the coupling pole 2 of the vehicle is loosely pivoted a locking pawl 11 provided with a handle 12, and said pawl engages a series of ratchet teeth formed upon the rear face of the lever 10, thus locking the said lever in position against the dash board, in which position the springs 9 are put under suitable tension, and in moving the lever into this position the rod 6 is caused to rotate. The pawl 11 being pivoted loosely can be pulled or kicked either to the right or left in order to quickly disengage it from the lever, it being understood that said pawl also passes through a slot of suitable length and width in the bottom of the vehicle.

Adjacent each end of the axle 1 extend a pair of bearing plates 13 and between the plates of each pair I mount a rotatable flanged drum 14 each drum being provided with longitudinal webs 15 arranged ninety degrees apart. To lock these drums against rotation the rod 6 is provided with two rigid arms 16 which carry locking plates 17, said plates being slightly beveled upon their upper faces terminating in a comparatively thin edge.

When the pawl 11 is disengaged from the lever 10 the springs 9 will rotate the rod 6 so as to lift the arm 16 and the locking plate 17 to a sufficient extent to permit free rotation of the drums, but by bringing said drums so that a web of each drum will extend rearwardly in a horizontal plane and by pushing the lever 10 forward, in which position it is locked by the pawl, the rod 6 will be rotated so as to throw the locking pawls 17 into engagement with said horizontal webs, thus preventing any rotation of the drums due to a pull upon the upwardly extending adjacent web.

Upon the rear end of each shaft is secured a depending metal plate 18, the said shaft plates forming hooks which engage the upwardly extending webs, and these plates have their free ends rolled over as shown in order that they may slide readily upon the beveled surface of the locking plates 17 when the horse is holding back.

In order to more securely lock the shafts in position and prevent them from becoming disengaged from the webs by jumping upwardly over the webs or jumping laterally over the drum flanges I secure to the rod 6 tapering curved shields 19, which when the lever 10 is in locked position fit down over the rear ends of the shafts, but at the same time leave room for a certain amount of play. When rotation of the rod 6 lifts the locking plates these shields are also lifted and the shafts slip readily from beneath them. It will be obvious that as soon as the locking plates are lifted the pull of the shafts will at once cause the drums to rotate and a quarter rotation will leave the shafts entirely free from the vehicle. I also provide suitable dust caps 20 for the bearing plates 13. The shields 19 also act as a covering for the device and prevent foreign matter from accumulating upon the drums and interfering with the operation of the device.

What I claim is:—

1. A device of the kind described comprising in combination with an axle, a revoluble, flanged and webbed drum supported from said axle, shafts, means carried by the rear ends of the shafts for engaging an upright web of the drum, clamps adapted to engage webs lying in a horizontal plane, means for locking said clamps, and means for automatically lifting said clamps out of alinement with said webs when unlocked.

2. A device of the kind described comprising in combination with an axle and shafts detachable from said axle, of rotatable webbed drums supported from the axle, means for locking said drums against rotation with a web of each drum in an upright position, means carried by the shafts for engaging said webs while in an upright position, and means for releasing the locking mechanism and permitting free rotation of the drums.

3. A device of the kind described comprising rotatable drums said drums being webbed, shafts adapted to engage webs of the drums, a rod rotatably mounted upon the front axle of a vehicle, said rod having an off-set portion, a lever extending from said off-set portion into the vehicle, means for normally holding said rod and lever in a predetermined position, means for locking the said lever in an adjusted position, and clamping plates carried by said rod said clamping plates engaging webs of the drums and holding said drums against rotation upon adjustment of the lever.

4. The combination with a vehicle, having shafts detachable therefrom, of flanged, webbed drums supported from said vehicle, means carried by the shafts for engaging the webs of said drums a rotatable rod mounted upon the front axle having an off-set portion, springs adapted to rotate said rod in one direction, a lever carried by said off-set portion, said lever being notched, a loosely pivoted pawl for locking said lever in an adjusted position, the said springs being put under tension when the lever is in locked position, clamping plates rigidly connected to said rod and in position to be brought into engagement with the drum webs when the lever is pushed forward and to be lifted clear of said webs when the rotation of the rod by the said springs throws the lever rearward, and shields carried by said rod, said shields extending over said drums, and covering and protecting the rear end portions of said shafts, as and for the purpose set forth.

MILTON POLLAK POWELL, Jr.

Witnesses:
B. M. BROWN,
I. S. BANKS.